US012673703B2

(12) United States Patent (10) Patent No.: US 12,673,703 B2
Jung et al. (45) Date of Patent: Jul. 7, 2026

(54) AUTONOMOUS DRIVING CONTROL APPARATUS AND METHOD THEREOF

(71) Applicants: Hyundai Motor Company, Seoul (KR); Kia Corporation, Seoul (KR)

(72) Inventors: Chang Young Jung, Seoul (KR); Jae Hee Kim, Seoul (KR); Yong Suk Kang, Seoul (KR); Seok Young Shin, Gwacheon-Si (KR); Jin Bong Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 18/387,147

(22) Filed: Nov. 6, 2023

(65) Prior Publication Data

US 2024/0383504 A1 Nov. 21, 2024

(30) Foreign Application Priority Data

May 15, 2023 (KR) ........................ 10-2023-0062643

(51) Int. Cl.
 *B60W 50/14* (2020.01)
 *B60W 60/00* (2020.01)
(52) U.S. Cl.
 CPC ........ *B60W 60/0057* (2020.02); *B60W 50/14* (2013.01); *B60W 60/001* (2020.02); *B60W 2552/20* (2020.02); *B60W 2554/80* (2020.02); *B60W 2720/40* (2013.01)

(58) Field of Classification Search
 None
 See application file for complete search history.

(56) References Cited

U.S. PATENT DOCUMENTS

| | | | |
|---|---|---|---|
| 8,862,317 B2 * | 10/2014 | Shin ...................... | B60K 28/06 |
| | | | 701/36 |
| 2016/0001781 A1 * | 1/2016 | Fung ........................ | G07C 9/37 |
| | | | 701/36 |
| 2019/0300014 A1 * | 10/2019 | Nagase .................. | B60K 35/60 |
| 2019/0315346 A1 * | 10/2019 | Yoo ........................ | B60W 50/12 |
| 2023/0347920 A1 * | 11/2023 | Cserna .................. | B60W 50/14 |
| 2024/0042926 A1 * | 2/2024 | Nojiri .................. | B60Q 1/2603 |
| 2024/0359711 A1 * | 10/2024 | St. Gray ........... | B60W 60/0053 |

* cited by examiner

*Primary Examiner* — Daniel L Greene
*Assistant Examiner* — Robert L Pinkerton
(74) *Attorney, Agent, or Firm* — Banner & Witcoff, Ltd.

(57) ABSTRACT

An autonomous driving control apparatus includes a display device, a notification device, a memory storing at least one instruction, and a controller. For example, the at least one instruction is configured to, when executed by the controller, cause the autonomous driving control apparatus to: determine, while performing autonomous driving control of a host vehicle, a hands-off time duration in which a driver of the host vehicle takes both hands off a steering wheel of the host vehicle, and provide a first notification using at least one of the display device or the notification device, based on the hands-off time duration being greater than a first threshold time duration or based on lateral acceleration of the host vehicle being maintained at a value greater than a threshold value for at least a second threshold time duration in a hands-off situation.

20 Claims, 8 Drawing Sheets

| CURVATURE (1/M) \ LATERAL ACCELERATION (M/S²) | 0 | 1 | 2 | 3 | 4 | 5 |
|---|---|---|---|---|---|---|
| 0 | 0.5 (SECONDS) | 0.5 | 0.5 | 0.5 | 0.5 | 0.5 |
| 0.002 | 2.5 | 2.5 | 2.5 | 1.5 | 1.5 | 1.5 |
| 0.003 | 3 | 3 | 3 | 3 | 3 | 3 |
| 0.01 | 3 | 3 | 3 | 3 | 3 | 3 |
| 0.0125 | 3 | 3 | 3 | 3 | 3 | 3 |
| 0.02 | 3 | 3 | 3 | 3 | 3 | 3 |

FIG.4

AUTONOMOUS DRIVING CONTROL APPARATUS AND METHOD THEREOF

CROSS-REFERENCE TO RELATED APPLICATION

This application claims the benefit of priority to Korean Patent Application No. 10-2023-0062643, filed in the Korean Intellectual Property Office on May 15, 2023, the entire contents of which are incorporated herein by reference.

TECHNICAL FIELD

The present disclosure relates to an autonomous driving control apparatus and a method thereof, and more particularly, relates to technologies of providing various notification functions to a user (or a driver) in an autonomous driving control mode for a host vehicle.

BACKGROUND

With increasing adoption of autonomous vehicles, there have been advancements in various technologies related to autonomous driving. Autonomous driving may be further categorized, based on the level of control, as partial autonomous driving, conditional autonomous driving, high autonomous driving, and/or full autonomous driving.

It may be necessary to hand over control authority of a host vehicle to a user during autonomous driving of the host vehicle in a specific driving situation or providing the user with a notification about the switching of the control authority.

For example, when the user does not hold the steering wheel for an extended period of time (e.g., longer than a specified time limit in a hands-off state), it may be necessary to switch the driving mode from an autonomous driving mode to a manual driving mode.

SUMMARY

The present disclosure has been made to solve the above-mentioned problems occurring in the prior art while advantages achieved by the prior art are maintained intact.

An aspect of the present disclosure provides an autonomous driving control apparatus for providing a user with a guide about a hands-off situation (e.g., a user interface (UI) for guiding the user to hold the steering wheel), when a hands-off state is greater than a predetermined time limit or when a lateral acceleration value is maintained greater than a specified value during a specified time while a host vehicle is traveling and a method thereof.

Another aspect of the present disclosure provides an autonomous driving control apparatus for providing a visual notification function and/or an audible notification function depending on whether there is a hands-off state, when releasing an autonomous driving control operation for a host vehicle regardless of an intention of a user and a method thereof.

Another aspect of the present disclosure provides an autonomous driving control apparatus for providing a function of ramping down an output torque for controlling a host vehicle based on a curvature of a road where the host vehicle is traveling and/or lateral acceleration of the host vehicle, when autonomous driving control for the host vehicle is released, and a method thereof.

Another aspect of the present disclosure provides an autonomous driving control apparatus for ramping down an output torque during a predetermined time when a hands-on situation (e.g., a situation where a user holds the steering wheel) occurs, when autonomous driving control for a host vehicle is released, identifying a ramp-down time using a map table stored in a memory, when a hands-off situation (e.g., a situation where the user does not hold the steering wheel) occurs, and ramping down the output torque during the identified ramp-down time and a method thereof.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an autonomous driving control apparatus comprising: a display device; a notification device; a memory storing at least one instruction; and a controller operatively connected to the display device, the notification device, and the memory. The at least one instruction may be configured to, when executed by the controller, cause the autonomous driving control apparatus to: determine, while performing autonomous driving control of a host vehicle, a hands-off time duration in which a driver of the host vehicle takes both hands off a steering wheel of the host vehicle; and provide, based on the hands-off time duration being greater than a first threshold time duration or based on lateral acceleration of the host vehicle being maintained at a value greater than a threshold value for at least a second threshold time duration in a hands-off situation, a first notification using at least one of the display device or the notification device.

The at least one instruction may be configured to, when executed by the controller, cause the autonomous driving control apparatus to provide the first notification by displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation.

The at least one instruction may be configured to, when executed by the controller, further cause the autonomous driving control apparatus to: provide, based on the hands-off time duration being greater than a third threshold time duration and based on the autonomous driving control of the host vehicle being released, a second notification using at least one of the display device or the notification device. The third threshold time duration may be greater than the first threshold time duration.

The at least one instruction may be configured to, when executed by the controller, cause the autonomous driving control apparatus to provide the second notification by: displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation; and outputting, using the notification device, a warning sound associated with the hands-off situation or a release of the autonomous driving control.

The autonomous driving control apparatus may further include a sensor. The at least one instruction may be configured to, when executed by the controller, further cause the autonomous driving control apparatus to: determine, using the sensor, a curvature of a road on which the host vehicle is traveling; and ramp down, based on at least one of the curvature or the lateral acceleration and based on the autonomous driving control of the host vehicle being released, an output torque for controlling the host vehicle.

The at least one instruction may be configured to, when executed by the controller, cause the autonomous driving control apparatus to: ramp down, based on a hands-on status in which the driver of the host vehicle keeps at least one hand on the steering wheel of the host vehicle, the output torque during a predetermined time.

The memory may further store a map table comprising a ramp-down time. The ramp-down time may correspond to the curvature and the lateral acceleration. The at least one instruction may be configured to, when executed by the controller, further cause the autonomous driving control apparatus to: determine, based on a hands-off status and using the map table, the ramp-down time corresponding to the curvature and the lateral acceleration; and ramp down the output torque during the ramp-down time.

The at least one instruction may be configured to, when executed by the controller, further cause the autonomous driving control apparatus to: release, based on first sensor data of the sensor for the autonomous driving control being out of a specified range, the autonomous driving control; based on at least one of the curvature or the lateral acceleration, ramp down the output torque for controlling the host vehicle; and, based on second sensor data of the sensor while ramping down the output torque being within the specified range, resume the autonomous driving control.

According to one or more example embodiments of the present disclosure, an autonomous driving control method may include: determining, by a controller and while performing autonomous driving control of a host vehicle, a hands-off time duration in which a driver of the host vehicle takes both hands off a steering wheel of the host vehicle; and, based on the hands-off time duration being greater than a first threshold time duration or based on lateral acceleration of the host vehicle being maintained at a value greater than a threshold value for at least a second threshold time duration in a hands-off situation, providing, by the controller, a first notification using at least one of a display device or a notification device.

Providing the first notification may include: providing the first notification by displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation.

The autonomous driving control method may further include: providing, by the controller and based on the hands-off time duration being greater than a third threshold time duration and based on the autonomous driving control of the host vehicle being released, a second notification using at least one of the display device or the notification device, wherein the third threshold time duration is greater than the first threshold time duration.

Providing the second notification may include: displaying, using the display device, information about at least one of an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation; and outputting, using the notification device, a warning sound associated with the hands-off situation or a release of the autonomous driving control.

The autonomous driving control method may further include: determining, by the controller and using a sensor, a curvature of a road on which the host vehicle is traveling; and ramping down, based on at least one of the curvature or the lateral acceleration and based on the autonomous driving control of the host vehicle being released, an output torque for controlling the host vehicle.

Ramping down the output torque may include: ramping down, by the controller and based on a hands-on status in which the driver of the host vehicle keeps at least one hand on the steering wheel of the host vehicle, the output torque during a predetermined time.

Ramping down the output torque may include: determining, based on a hands-off status and using a map table, a ramp-down time corresponding to the curvature and the lateral acceleration; and ramping down the output torque during the ramp-down time.

According to one or more example embodiments of the present disclosure, a non-transitory computer-readable storage medium may store instructions that, when executed, cause: determining by a controller and while performing autonomous driving control of a host vehicle, a hands-off time duration in which a driver of the host vehicle takes both hands off a steering wheel of the host vehicle; and providing, based on the hands-off time duration being greater than a first threshold time duration or based on lateral acceleration of the host vehicle being maintained at a value greater than a threshold value for at least a second threshold time duration in a hands-off situation, a first notification using at least one of a display device or a notification device.

The instructions, when executed, may cause the providing the first notification by: displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation.

The instructions, when executed, may further cause: providing, based on the hands-off time duration being greater than a third threshold time duration and based on the autonomous driving control of the host vehicle being released, a second notification using at least one of the display device or the notification device, wherein the third threshold time duration is greater than the first threshold time duration.

The instructions, when executed, may cause the providing of the second notification by: displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation; and outputting, using the notification device, a warning sound associated with the hands-off situation or a release of the autonomous driving control.

The instructions, when executed, may further cause: determining, using a sensor, a curvature of a road on which the host vehicle is traveling; and based on at least one of the curvature or the lateral acceleration and based on the autonomous driving control of the host vehicle being released, ramping down an output torque for controlling the host vehicle.

According to an aspect of the present disclosure, an autonomous driving control apparatus may include a display device, a notification device, a memory storing at least one instruction, and a controller operatively connected with the display device, the notification device, and the memory. The at least one instruction may be configured to, when executed by the controller, cause the autonomous driving control apparatus to identify a hands-off duration, while performing autonomous driving control for a host vehicle, and provide a first notification function using at least one of the display device, the notification device, or a combination thereof, when the hands-off duration is greater than a first time limit or when lateral acceleration of the host vehicle is maintained greater than a specified value during a specified time.

According to an embodiment, the at least one instruction may be configured to, when executed by the controller, cause the autonomous driving control apparatus to provide the first notification function for displaying information about at least one of an ambient temperature of the host vehicle, a driving speed of the host vehicle, a driving mode of the host vehicle, a road of the host vehicle, an ambient object of the host vehicle, a remaining distance to a parking lot, a total driving distance, a first guide about a hands-off situation, or a combination thereof, using the display device, when the hands-off duration is greater than the first time limit or when the lateral acceleration of the host vehicle is maintained greater than the specified value during the specified time.

According to an embodiment, the at least one instruction may be configured to, when executed by the controller, cause the autonomous driving control apparatus to provide a second notification function using at least one of the display device, the notification device, or a combination thereof, when the hands-off duration is greater than a second time limit longer than the first time limit or when the autonomous driving control for the host vehicle is released.

According to an embodiment, the second notification function may include a display function for displaying information about at least one of the ambient temperature of the host vehicle, the driving speed of the host vehicle, the driving mode of the host vehicle, the road of the host vehicle, the ambient object of the host vehicle, the remaining distance to the parking lot, the total driving distance, a second guide about the hands-off situation, or a combination thereof, using the display device and a warning function for outputting a warning sound about the hands-off situation or the releasing of the autonomous driving control, using the notification device.

According to an embodiment, the autonomous driving control apparatus may further include a sensor device. For example, the at least one instruction may be configured to, when executed by the controller, cause the autonomous driving control apparatus to identify a curvature of a road where the host vehicle is traveling, using the sensor device, and ramp down an output torque for controlling the host vehicle based on at least one of the curvature, the lateral acceleration, or a combination thereof, when the autonomous driving control for the host vehicle is released.

According to an embodiment, the at least one instruction may be configured to, when executed by the controller, cause the autonomous driving control apparatus to ramp down the output torque during a predetermined time, when a hands-on situation occurs.

According to an embodiment, the memory may further store a map table including a ramp-down time corresponding to the curvature and the lateral acceleration For example, the at least one instruction may be configured to, when executed by the controller, cause the autonomous driving control apparatus to identify the ramp-down time corresponding to the curvature and the lateral acceleration using the map table, when a hands-off situation occurs, and ramp down the output torque during the identified ramp-down time.

According to an embodiment, the at least one instruction may be configured to, when executed by the controller, cause the autonomous driving control apparatus to release the autonomous driving control, when an error in first sensing data of the sensor device for the autonomous driving control is out of a specified range, and ramp down the output torque for controlling the host vehicle based on the at least one of the curvature, the lateral acceleration, or the combination thereof and resume the autonomous driving control, when it is identified that the error in second sensing data obtained using the sensor device while ramping down the output torque is within the specified range.

According to another aspect of the present disclosure, an autonomous driving control method may include identifying, by a controller, a hands-off duration, while performing autonomous driving control for a host vehicle, and providing, by the controller, a first notification function using at least one of a display device, a notification device, or a combination thereof, when the hands-off duration is greater than a first time limit or when lateral acceleration of the host vehicle is maintained greater than a specified value during a specified time.

According to an embodiment, the autonomous driving control method may further include providing, by the controller, the first notification function for displaying information about at least one of an ambient temperature of the host vehicle, a driving speed of the host vehicle, a driving mode of the host vehicle, a road of the host vehicle, an ambient object of the host vehicle, a remaining distance to a parking lot, a total driving distance, a first guide about a hands-off situation, or a combination thereof, using the display device, when the hands-off duration is greater than the first time limit or when the lateral acceleration of the host vehicle is maintained greater than the specified value during the specified time.

According to an embodiment, the autonomous driving control method may further include providing, by the controller, a second notification function using at least one of the display device, the notification device, or a combination thereof, when the hands-off duration is greater than a second time limit longer than the first time limit or when the autonomous driving control for the host vehicle is released.

According to an embodiment, the second notification function may include a display function for displaying information about at least one of the ambient temperature of the host vehicle, the driving speed of the host vehicle, the driving mode of the host vehicle, the road of the host vehicle, the ambient object of the host vehicle, the remaining distance to the parking lot, the total driving distance, a second guide about the hands-off situation, or a combination thereof, using the display device, and a warning function for outputting a warning sound about the hands-off situation or the releasing of the autonomous driving control, using the notification device.

According to an embodiment, the autonomous driving control method may further include identifying, by the controller, a curvature of a road where the host vehicle is traveling, using a sensor device, and ramping down, by the controller, an output torque for controlling the host vehicle based on at least one of the curvature, the lateral acceleration, or a combination thereof, when the autonomous driving control for the host vehicle is released.

According to an embodiment, the ramping down of the output torque for controlling the host vehicle based on the at least one of the curvature, the lateral acceleration, or the combination thereof by the controller, when the autonomous driving control for the host vehicle is released, may include ramping down, by the controller, the output torque during a predetermined time, when a hands-on situation occurs.

According to an embodiment, the ramping down of the output torque for controlling the host vehicle based on the at least one of the curvature, the lateral acceleration, or the combination thereof by the controller, when the autonomous driving control for the host vehicle is released, may include identifying a ramp-down time corresponding to the curvature and the lateral acceleration using a map table stored in a memory, when a hands-off situation occurs, and ramping down the output torque during the identified ramp-down time.

According to another aspect of the present disclosure, a computer-readable storage medium may include a program for executing an autonomous driving control method, the autonomous driving control method including identifying, by a controller, a hands-off duration, while performing autonomous driving control for a host vehicle, and providing, by the controller, a first notification function using at least one of a display device, a notification device, or a combination thereof, when the hands-off duration is greater than a first time limit or when lateral acceleration of the host vehicle is maintained greater than a specified value during a specified time.

According to an embodiment, the autonomous driving control method may further include providing, by the controller, the first notification function for displaying information about at least one of an ambient temperature of the host vehicle, a driving speed of the host vehicle, a driving mode of the host vehicle, a road of the host vehicle, an ambient object of the host vehicle, a remaining distance to a parking lot, a total driving distance, a first guide about a hands-off situation, or a combination thereof, using the display device, when the hands-off duration is greater than the first time limit or when the lateral acceleration of the host vehicle is maintained greater than the specified value during the specified time.

According to an embodiment, the autonomous driving control method may further include providing, by the controller, a second notification function using at least one of the display device, the notification device, or a combination thereof, when the hands-off duration is greater than a second time limit longer than the first time limit or when the autonomous driving control for the host vehicle is released.

According to an embodiment, the second notification function may include a display function for displaying information about at least one of the ambient temperature of the host vehicle, the driving speed of the host vehicle, the driving mode of the host vehicle, the road of the host vehicle, the ambient object of the host vehicle, the remaining distance to the parking lot, the total driving distance, a second guide about the hands-off situation, or a combination thereof, using the display device, and a warning function for outputting a warning sound about the hands-off situation or the releasing of the autonomous driving control, using the notification device.

According to an embodiment, the autonomous driving control method may further include identifying, by the controller, a curvature of a road where the host vehicle is traveling, using a sensor device, and ramping down, by the controller, an output torque for controlling the host vehicle based on at least one of the curvature, the lateral acceleration, or a combination thereof, when the autonomous driving control for the host vehicle is released.

BRIEF DESCRIPTION OF THE DRAWINGS

The above and other objects, features and advantages of the present disclosure will be more apparent from the following detailed description taken in conjunction with the accompanying drawings:

FIG. 4 is a drawing illustrating an example of a map table available when an autonomous driving control apparatus determines a ramp-down time;

Figure 1:
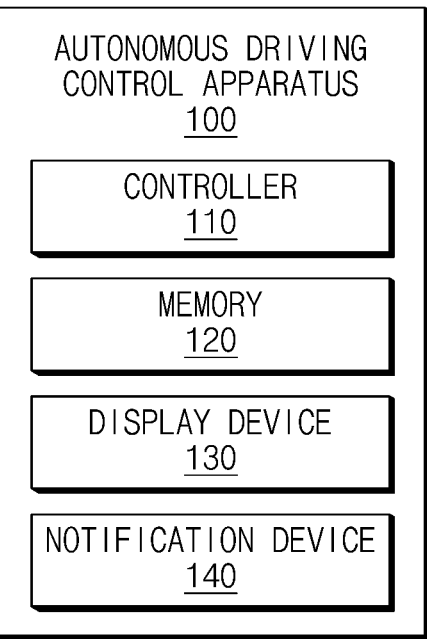
FIG. 1 is a block diagram illustrating components of an autonomous driving control apparatus.

With regard to description of drawings, the same or similar denotations may be used for the same or similar components.

DETAILED DESCRIPTION

Hereinafter, one or more example embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the example embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this disclosure belongs. It will be understood that terms used herein should be interpreted as having a meaning that is consistent with their meaning in the context of this disclosure and the relevant art and will not be interpreted in an idealized or overly formal sense unless expressly so defined herein.

An autonomous driving control apparatus may use various components for notifying the user of the need to change the driving mode of the host vehicle. As an example, the autonomous driving control apparatus may visually and/or audibly provide the user with a notification function using various devices (e.g., at least one of a display, a speaker, or a combination thereof) provided in the host vehicle.

However, when a driving environment of the host vehicle is a relatively dangerous for autonomous driving control, there is a chance that the host vehicle may release an autonomous driving control operation without providing the user with a proper notification about the transfer of control authority.

For example, when the host vehicle is traveling on a road with a high degree of curvature (e.g., an inter change (IC) or a junction (JC)), an error may occur in sensor data obtained using a sensor device (e.g., a camera). Thus, the autonomous driving control apparatus may release an autonomous driving control operation for the host vehicle to prevent such a problem.

In this case, the user may not be prepared to take over control of the host vehicle. Thus, the user and the host vehicle may be exposed to a higher risk of an accident while driving.

Hereinafter, one or more example embodiments of the present disclosure will be described in detail with reference to FIGS. 1 to 8.

FIG. 1 is a block diagram illustrating components of an autonomous driving control apparatus.

An autonomous driving control apparatus 100 may include at least one of a controller 110, a memory 120, a display device 130, a notification device 140, or a combination thereof. The components of the autonomous driving control apparatus 100, which are shown in FIG. 1, are illustrative, and embodiments of the present disclosure are not limited thereto. For example, the autonomous driving control apparatus 100 may further include components (e.g., at least one of an interface, a communication device, a sensor device, or a combination thereof) which are not shown in FIG. 1.

The controller 110 may be operatively connected with the memory 120, the display device 130, and/or the notification device 140. For example, the controller 110 may control operations of the memory 120, the display device 130, and/or the notification device 140.

For example, the controller 110 may perform autonomous driving control for a host vehicle based on one of a plurality of autonomous driving levels. As an example, the controller 110 may identify that an event associated with switching control authority of a host vehicle occurs, while controlling the host vehicle in an autonomous driving mode based on an autonomous driving level (e.g., Level 3).

For example, the event associated with switching the control authority of the host vehicle may include a situation where a hands-off duration is greater than a time limit. As an example, a hands-off state (also referred to as a hands-off situation) may include a state where a user (e.g., the driver) is not holding (e.g., controlling) the steering wheel of the vehicle (e.g., has both of their hands (alternatively one of their hands) off the steering wheel). In other words, during the hands-off state, the user may not be exerting physical control over the steering wheel.

For example, the controller 110 may identify a hands-off duration, while performing autonomous driving control for the host vehicle. As an example, the controller 110 may provide various notification functions based on a hands-off duration, a magnitude of lateral acceleration of the host vehicle, and/or whether autonomous driving control is maintained.

As an example, if the hands-off duration is greater than a first time limit (e.g., 12 seconds) or if the lateral acceleration of the host vehicle is maintained greater than a specified value (e.g., 2.5 m/s$^2$) during a specified time (e.g., 1 second), the controller 110 may provide a first notification function using the display device 130 and/or the notification device 140.

As an example, the first notification function may include a notification function where the controller 110 displays information about at least one of an ambient temperature of the host vehicle, a driving speed of the host vehicle, a driving mode of the host vehicle, a road on which the host vehicle is traveling, an ambient object of the host vehicle (e.g., an object proximate to the host vehicle), a remaining distance to a destination (e.g., a parking lot), a total driving distance, a first guide about a hands-off situation (e.g., a user interface (UI) for guiding the user to holding the steering wheel), or a combination thereof.

As an example, if the hands-off duration is greater than a second time limit or if the autonomous driving control for the host vehicle is released (or deactivated), the controller 110 may provide a second notification function using the display device 130 and/or the notification device 140. The second time limit may be, for example, a time (e.g., 27 seconds) longer than the first time limit. When the autonomous driving control is released may include, for example, when a failure occurs in a part of an autonomous driving control system or when an error in at least a portion of sensor data for autonomous driving control is out of a specified range.

As an example, the second notification function may include a display function where the controller 110 displays information about at least one of an ambient temperature of the host vehicle, a driving speed of the host vehicle, a driving mode of the host vehicle, a road on which the host vehicle is traveling, an ambient object of the host vehicle, a remaining distance to a destination (e.g., a parking lot), a total driving distance, a second guide about a hands-off situation (e.g., a UI for guiding the user to hold the steering wheel), or a combination thereof. The second guide may include one or more graphical user interfaces (GUIs), each of which has at least one of a color different from the first guide, a font different from the first guide, a size different from the first guide, or a combination thereof.

As an example, the second notification function may include a warning function where the controller 110 outputs a warning sound about a hands-off situation or the releasing of the autonomous driving control using the notification device 140. The notification device 140 may include, for example, at least one speaker provided in at least a part of the host vehicle.

For example, when receiving a response from the user while performing the first notification function and/or the second notification function, the controller 110 may immediately end the notification function and may hand over control authority for the host vehicle to the user. As an example, the response received from the user may include at least one of a hands-on state (e.g., a state where the user holds the steering wheel), pressure on an accelerator pedal and/or a brake pedal of the host vehicle, a touch input to a display of the host vehicle, or a combination thereof.

For example, the controller 110 may control an output torque for controlling the host vehicle using at least a portion of driving environment information of the host vehicle, which is obtained using a sensor device (not shown). The controller 110 may identify, for example, a curvature of a road where the host vehicle is traveling using the sensor device. For example, if the autonomous driving control for the host vehicle is released, the controller 110 may ramp down an output torque for controlling the host vehicle based on at least one of the curvature, the lateral acceleration, or a combination thereof.

For example, if the autonomous driving control for the host vehicle is released, the controller 110 may ramp down an output torque based on a different slope (or during a different time) depending on whether a hands-off situation occurs.

As an example, if the autonomous driving control for the host vehicle is released and if the hands-on situation occurs, the controller 110 may ramp down an output torque during a predetermined time (e.g., 0.5 seconds). The predetermined time may be, for example, a setting value set by the user or a setting value set at the time the host vehicle is manufactured.

As an example, if the autonomous driving control for the host vehicle is released and if the hands-off situation occurs, the controller 110 may identify a ramp-down time corresponding to the curvature and the lateral acceleration using the map table. An example of the map table will be described in detail in a description of FIG. 4, which will be described below. The controller 110 may identify a ramp-down time by means of the map table, using the curvature of the road where the host vehicle is traveling and the real-time lateral acceleration of the host vehicle, and may ramp down an output torque during the identified ramp-down time.

As an example, in the situation where the autonomous driving control is released, a ramp-down time when the hands-on situation occurs may be less than a ramp-down time if the hands-off situation occurs.

For example, the controller 110 may determine whether to resume the autonomous driving control based on a magnitude of an error in sensor data obtained using the sensor device (not shown) while ramping down the output torque.

As an example, if an error in the first sensor data obtained by means of the sensor device for autonomous driving control is out of a specified range, the controller 110 may release the autonomous driving control for the host vehicle. For example, the controller 110 may ramp down an output torque for controlling the host vehicle, based on at least one of the curvature of the road where the host vehicle is traveling, the real-time lateral acceleration of the host vehicle, or combination thereof.

As an example, if an error in the second sensor data obtained by means of the sensor device while ramping down the output torque is within the specified range, the controller 110 may resume the autonomous driving control for the host vehicle.

The memory 120 may store a command or data. For example, the memory 120 may store one or more instructions, when executed by the controller 110, causing the autonomous driving control apparatus 100 to perform various operations.

For example, the memory 120 and the controller 110 may be implemented as one chipset. The controller 110 may include at least one of a communication processor or a modem.

For example, the memory 120 may store various pieces of information associated with the autonomous driving control apparatus 100. As an example, the memory 120 may store information about an operation history of the controller 110. As an example, the memory 120 may store information about states and/or operations of components (e.g., at least one of an engine control unit (ECU), the controller 110, the display device 130, the notification device 140, or a combination thereof) of the host vehicle.

The display device 130 may include at least one output device. For example, the display device 130 may include an output device (e.g., a display) included in at least a part of the host vehicle.

For example, the display device 130 may provide the user with various pieces of information about a driving situation of the host vehicle by means of visual content.

As an example, the display device 130 may output various pieces of driving information (e.g., information about at least one of an ambient temperature of the host vehicle, a driving speed of the host vehicle, a driving mode of the host vehicle, a road on which the host vehicle is traveling, an ambient object of the host vehicle, a remaining distance to a destination (e.g., a parking lot), a total driving distance, a guide about a hands-off situation, or a combination thereof) generated while the host vehicle is traveling in the autonomous driving mode.

A description will be given in detail of an example of the notification function output on the display device 130, in FIG. 3 below and a description of FIG. 3.

The notification device 140 may include at least one output device. For example, the display device 130 may include an output device (e.g., a speaker) included in at least a part of the host vehicle.

For example, the notification device 140 may output various types of sounds to the outside.

As an example, the notification device 140 may output a warning sound about a hands-off situation or the releasing of the autonomous driving control, based on control of the controller 110.

As an example, the notification device 140 may output a warning sound including a sound including information for notifying the user that it corresponds to the hands-off situation and/or information for guiding the user to hold the steering wheel, based on control of the controller 110.

Figure 2:
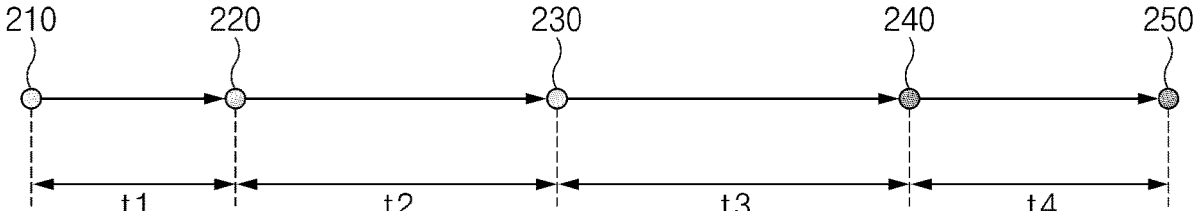
FIG. 2 is an operational conceptual diagram of an autonomous driving control apparatus.

FIG. 2 is an operational conceptual diagram of an autonomous driving control apparatus.

An autonomous driving control apparatus (e.g., an autonomous driving control apparatus 100 of FIG. 1) may control a host vehicle in an autonomous driving mode based on autonomous driving control (e.g., a dynamic driving task (DDT)).

The autonomous driving control apparatus may identify that a hands-off situation occurs at a first time point 210.

For example, if the hands-off situation occurs at the first time point 210, the autonomous driving control apparatus may continue monitoring (or identifying) a hands-off duration.

For example, if the hands-off duration is greater than a first time limit t1 (e.g., 12 seconds), the autonomous driving control apparatus may provide a first notification function using a display device (e.g., a display device 130 of FIG. 1) and/or a notification device (e.g., a notification device 140 of FIG. 1). As an example, at a second time point 220 when the first time limit t1 elapses from the first time point 210, the autonomous driving control apparatus may provide a user with the first notification function.

For example, although the hands-off duration is not greater than the first time limit t1, if current lateral acceleration of the host vehicle is maintained greater than a specified value (e.g., 2.5 m/s$^2$) during a specified time (e.g., 1 second), the autonomous driving control apparatus may provide the first notification function using the display device and/or the notification device. As an example, in any one time point between the first time point 210 and the second time point 220, if the current lateral acceleration of the host vehicle is maintained greater than the specified value during the specified time, the autonomous driving control apparatus may provide the user with the first notification function.

As an example, the first notification function may include a notification function where information about at least one of an ambient temperature of the host vehicle, a driving speed of the host vehicle, a driving mode of the host vehicle, a road on which the host vehicle is traveling, an ambient object of the host vehicle, a remaining distance to a destination (e.g., a parking lot), a total driving distance, a first guide about a hands-off situation (e.g., a UI for guiding the user to hold the steering wheel), or a combination thereof is displayed on the display device.

For example, if the hands-off duration continues until a third time point 230 when a second time t2 (e.g., 15 seconds) elapses from the second time point 220 (or if the hands-off duration is greater than a second time limit (e.g., 27 seconds)) (or if the hands-off duration is greater than the sum of the first time limit t1 and the second time t2), the autonomous driving control apparatus may provide a second notification function using the display device and/or the notification device. As an example, at the third time point 230 when the second time limit elapses from the first time point 210, the autonomous driving control apparatus may provide the user with the second notification function.

As an example, although the hands-off duration is not greater than the second time limit, if the autonomous driving control for the host vehicle is released, the autonomous driving control apparatus may provide the second notification function using the display device and/or the notification device. As an example, in any one time point between the first time point 210 and the third time point 230, if the autonomous driving control for the host vehicle is released, the autonomous driving control apparatus may provide the user with the second notification function.

As an example, if the autonomous driving control is released may include, for example, if a failure occurs in a part of an autonomous driving control system or if an error in at least a portion of sensor data for autonomous driving control is out of a specified range.

As an example, the second notification function may include a display function where information about at least one of an ambient temperature of the host vehicle, a driving speed of the host vehicle, a driving mode of the host vehicle, a road on which the host vehicle is traveling, an ambient object of the host vehicle, a remaining distance to a destination (e.g., a parking lot), a total driving distance, a second guide about a hands-off situation (e.g., a UI for guiding the user to hold the steering wheel), or a combination thereof is displayed on the display device. The second guide may include one or more GUIs, each of which has at least one of a color different from the first guide, a font different from the first guide, a size different from the first guide, or a combination thereof.

For example, if the hands-off duration continues until a fourth time point 240 when a third time t3 (e.g., 25 seconds) elapses from the third time point 230 (or if the hands-off duration is greater than a third time limit (e.g., 52 seconds)) (or if the hands-off duration is greater than the sum of the first time limit t1, the second time t2, and the third time t3, the autonomous driving control apparatus may release the autonomous driving control for the host vehicle. As an example, at the fourth time point 240 when the third time limit elapses from the first time point 210, the autonomous driving control apparatus may release the autonomous driving control for the host vehicle. In this case, the autonomous driving control apparatus may provide the user with a notification function indicating that the autonomous driving control is released, using the display device and/or the notification device.

For example, the autonomous driving control apparatus may provide the user with the notification function indicating that the autonomous driving control is released at a time point (e.g., the fourth time point 240) when the hands-off duration is greater than the third time limit on the basis of the first time point 210 during a fourth time t4.

For example, the autonomous driving control apparatus may end the notification function indicating that the autonomous driving control is released at a fifth time point 250 when the fourth time t4 elapses from the fourth time point 240.

Figure 3:
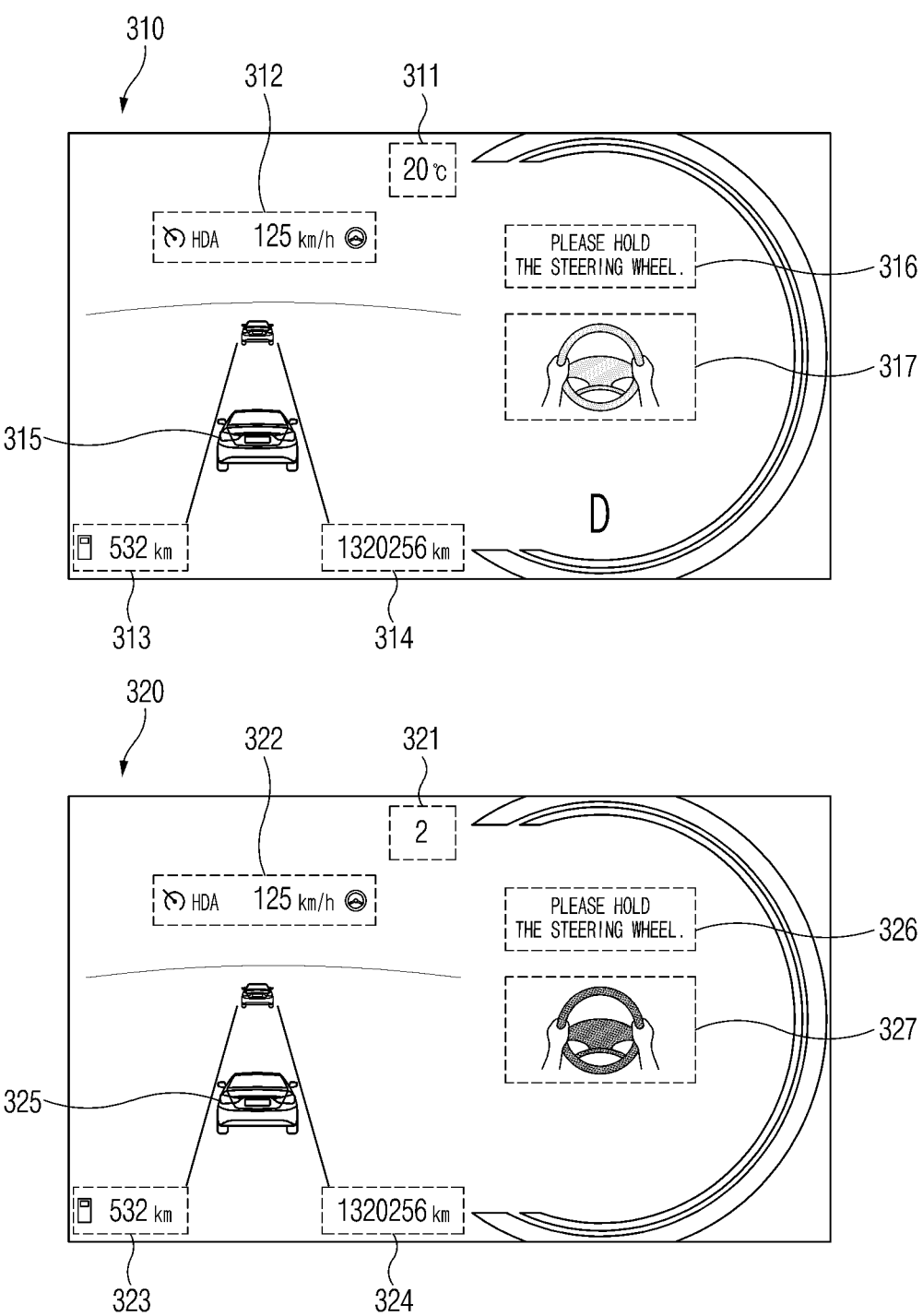
FIG. 3 is a drawing conceptually illustrating a notification function provided by an autonomous driving control apparatus.

FIG. 3 is a drawing conceptually illustrating a notification function provided by an autonomous driving control apparatus.

An autonomous driving control apparatus (e.g., an autonomous driving control apparatus 100 of FIG. 1) may provide a user with various types of notification functions using a display device (e.g., a display device 130 of FIG. 1).

Referring to reference numeral 310, the autonomous driving control apparatus may provide the user with a first notification function using the display device.

For example, if a hands-off duration is greater than a first time limit or if lateral acceleration of a host vehicle is maintained greater than a specified value during a specified time, the autonomous driving control apparatus may provide the user with the first notification function using the display device.

For example, the first notification function may include a function for providing the user with information about at least one of an ambient temperature 311 of the host vehicle, a driving speed and/or a driving mode 312 of the host vehicle, a remaining distance 313 to a destination (e.g., a parking lot), a total driving distance 314 of the host vehicle, a road and/or an ambient object 315 of the host vehicle, first guides 316 and 317 about a hands-off situation, or a combination thereof by means of the display device.

Referring to reference numeral 320, the autonomous driving control apparatus may provide the user with a second notification function using the display device.

For example, if the hands-off duration is greater than a second time limit longer than the first time limit or if autonomous driving control for the host vehicle is released, the autonomous driving control apparatus may provide the user with the second notification function using the display device.

For example, the second notification function may include a function for providing the user with information about at least one of an ambient temperature 321 of the host vehicle, a driving speed and/or a driving mode 322 of the host vehicle, a remaining distance 323 to a destination (e.g., a parking lot), a total driving distance 324 of the host vehicle, a road and/or an ambient object 325 of the host vehicle, second guides 326 and 327 about a hands-off situation, or a combination thereof by means of the display device.

As an example, the second guides 326 and 327 may include one or more GUIs, each of which has at least one of a color different from the first guide 316 and 317, a font different from the first guides 316 and 317, a size different from the first guide 316 and 317, or a combination thereof.

FIG. 4 is a drawing illustrating an example of a map table available when an autonomous driving control apparatus determines a ramp-down time.

An autonomous driving control apparatus (e.g., an autonomous driving control apparatus 100 of FIG. 1) may store a map table shown in FIG. 4 in a memory (e.g., a memory 120 of FIG. 1). The map table shown in FIG. 4 is illustrative, and embodiments of the present disclosure are not limited thereto.

If autonomous driving control for a host vehicle is released, the autonomous driving control apparatus may identify a ramp-down time using the map table, using a curvature of a road where the host vehicle is traveling and lateral acceleration of the host vehicle.

The autonomous driving control apparatus may ramp down an output torque during the ramp-down time identified using the map table.

For example, if the curvature of the road is "0" and if the lateral acceleration of the host vehicle is 0 to 5 m/s², the autonomous driving control apparatus may identify the ramp-down time as 0.5 seconds.

For example, if the curvature of the road is 0.002 and if the lateral acceleration of the host vehicle is 0 to 2 m/s², the autonomous driving control apparatus may identify the ramp-down time as 2.5 seconds.

For example, if the curvature of the road is 0.002 and if the lateral acceleration of the host vehicle is 3 to 5 m/s², the autonomous driving control apparatus may identify the ramp-down time as 1.5 seconds.

For example, if the curvature of the road is 0.003 to 0.02 and if the lateral acceleration of the host vehicle is 0 to 5 m/s², the autonomous driving control apparatus may identify the ramp-down time as 3 seconds.

The map table shown in FIG. 4 is illustrative, and embodiments of the present disclosure are not limited thereto. For example, while the autonomous driving control apparatus is operating, the map table may be updated in real time using an artificial intelligence model included in the autonomous driving control apparatus. For example, the map table may be updated based on settings of a manager and/or a user.

Figure 5:
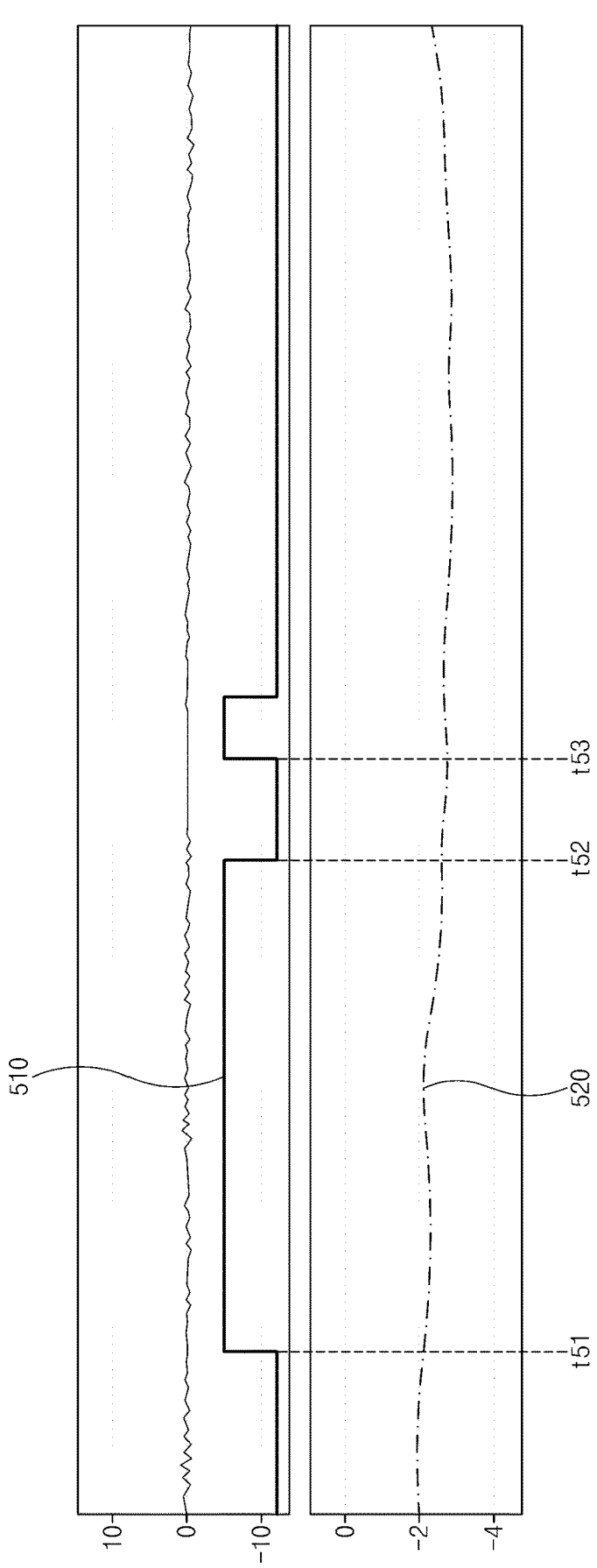
FIG. 5 illustrates data derived through a real vehicle test while an autonomous driving control apparatus provides a notification function.

FIG. 5 illustrates data derived through a real vehicle test while an autonomous driving control apparatus provides a notification function.

Referring to reference numeral 510, an autonomous driving control apparatus (e.g., an autonomous driving control apparatus 100 of FIG. 1) may provide a user with a first notification function at a first point t51 and may end the first notification function at a second point t52.

For example, the autonomous driving control apparatus may provide the first notification function at the first point t51, may identify a hands-on situation at the second point t52, and may end the first notification function.

For example, the autonomous driving control apparatus may detect that a hands-off situation is identified again, immediately after identifying the hands-on situation at the second point t52 and ending the first notification function.

For example, the autonomous driving control apparatus may identify that lateral acceleration of the host vehicle is maintained greater than a specified value during a specified time, although a time from the second point t52 to the third point t53 does not pass a first time limit for providing the first notification function, at a third point t53, and may provide the first notification function again.

For example, referring to reference numeral 520, the autonomous driving control apparatus may identify that the lateral acceleration of the host vehicle is maintained greater than the specified value during the specified time and may provide the user with the first notification function again.

Figure 6:
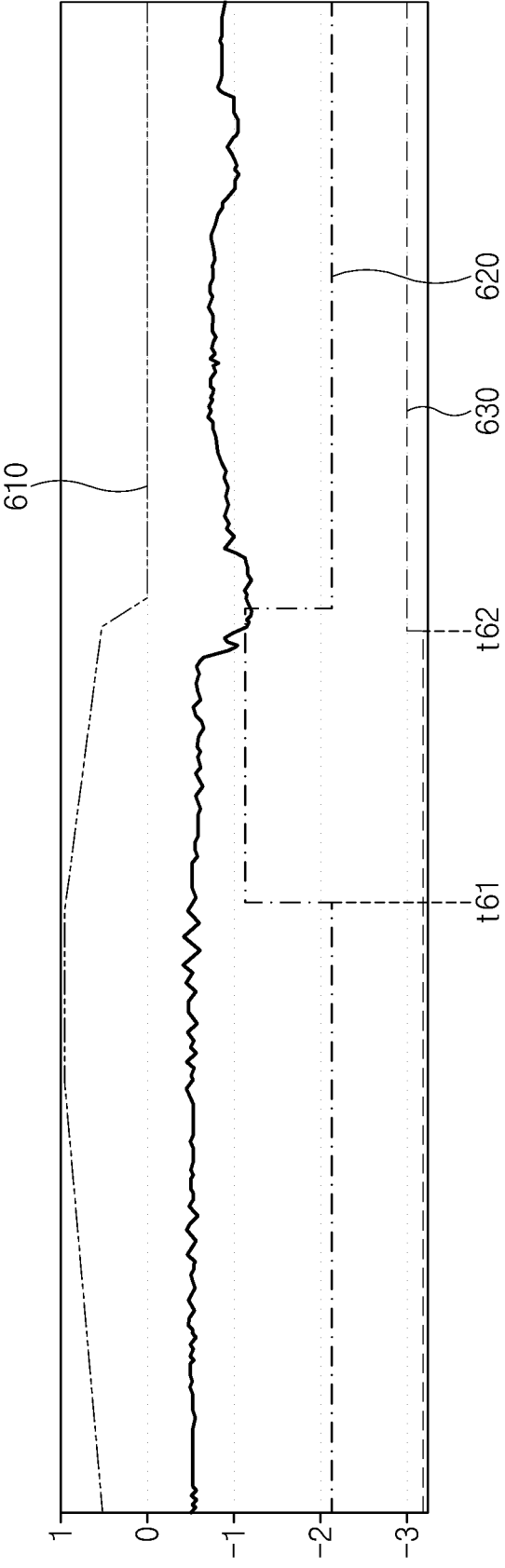
FIG. 6 illustrates data derived through a real vehicle test while an autonomous driving control apparatus provides a notification function.

FIG. 6 illustrates data derived through a real vehicle test while an autonomous driving control apparatus provides a notification function.

Referring to reference numerals 610, 620, and 630, an autonomous driving control apparatus (e.g., an autonomous driving control apparatus 100 of FIG. 1) may identify that autonomous driving control for a host vehicle is released and may provide a user with a second notification function.

For example, the autonomous driving control apparatus may immediately provide the second notification function based on that the autonomous driving control is released at the first point t61 and may ramp down an output torque of the host vehicle based on whether a hands-off situation occurs from the first point t61 depending on reference numeral 610.

As an example, referring to reference numeral 630, if the hands-off situation occurs at the time point when the autonomous driving control is released at the first point t61, the autonomous driving control apparatus may identify a ramp-down time corresponding to curvature and lateral acceleration, using a map table (e.g., a map table shown in FIG. 4) stored in a memory (e.g., a memory 120 of FIG. 1) and may ramp down an output torque during the identified ramp-down time.

As an example, referring to reference numeral 630, if the hands-off situation switches to a hands-on situation at a second point t62, the autonomous driving control apparatus may ramp down the output torque during a predetermined time (e.g., 0.2 seconds).

According to reference numeral 610, an absolute value of a slope where the output torque is ramped down from the first point t61 to the second point t62 may be less than an absolute value of a slope where the output torque is ramped down after the second point t62. In other words, the autonomous driving control apparatus may more quickly reduce an output torque when the hands-on situation occurs at the time point when the autonomous driving control is released than when the hands-off situation occurs.

Figure 7:
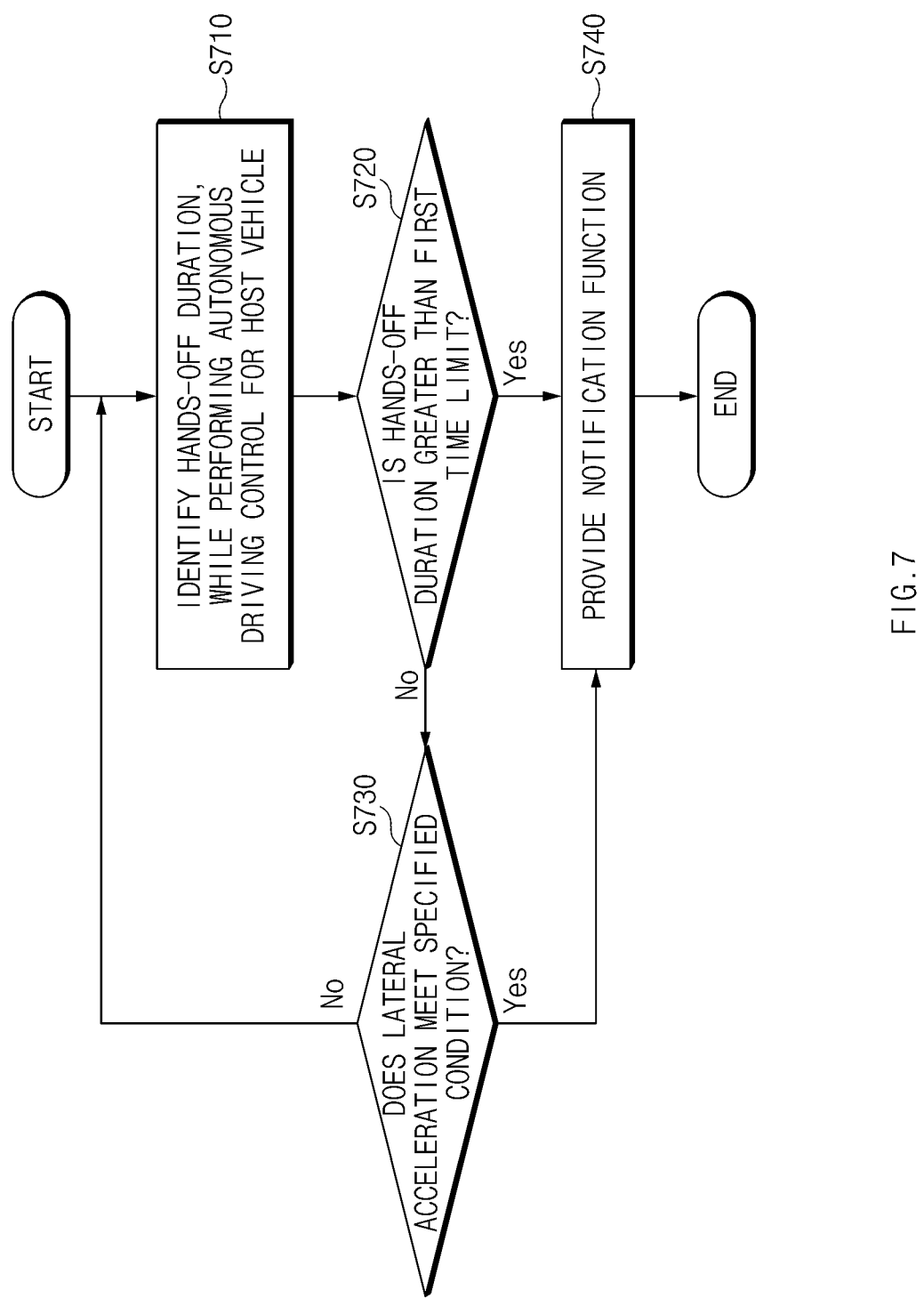
FIG. 7 is an operational flowchart of an autonomous driving control apparatus.

FIG. 7 is an operational flowchart of an autonomous driving control apparatus.

The autonomous driving control apparatus (e.g., an autonomous driving control apparatus 100 of FIG. 1) may perform operations disclosed in FIG. 7. For example, at least some of components (e.g., a controller 110 of FIG. 1, a memory 120 of FIG. 1, a display device 130, or a combination thereof) included in the autonomous driving control apparatus may be configured to perform the operations of FIG. 7.

Operations in S710 to S740 as described below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 7, may be briefly described or omitted.

In S710, the autonomous driving control apparatus may identify a hands-off duration, while performing autonomous driving control for a host vehicle.

In S720, the autonomous driving control apparatus may identify whether the hands-off duration is greater than a first time limit.

For example, the first time limit may be 12 seconds, but this is illustrative and embodiments of the present disclosure are not limited thereto.

For example, if the hands-off duration is greater than the first time limit (e.g., S720—Yes), the autonomous driving control apparatus may perform S740.

For example, if the hands-off duration is less than or equal to the first time limit (e.g., S720—No), the autonomous driving control apparatus may perform S730.

In S730, the autonomous driving control apparatus may identify whether lateral acceleration meets a specified condition.

As an example, the autonomous driving control apparatus may identify whether the host vehicle continues traveling in a state where the lateral acceleration of the host vehicle is greater than a specified value (e.g., 2.5 m/s$^2$) during a specified time (e.g., 1 second).

For example, if the lateral acceleration meets the specified condition (e.g., S730—Yes), the autonomous driving control apparatus may perform S740.

For example, if the lateral acceleration does not meet the specified condition (e.g., S730—No), the autonomous driving control apparatus may perform S710.

In S740, the autonomous driving control apparatus may provide a notification function.

For example, if the hands-off duration is greater than the first time limit or if the lateral acceleration of the host vehicle is maintained greater than the specified value during the specified time, the autonomous driving control apparatus may provide a user with a first notification function using a display device and/or a notification device included in the autonomous driving control apparatus.

Figure 8:
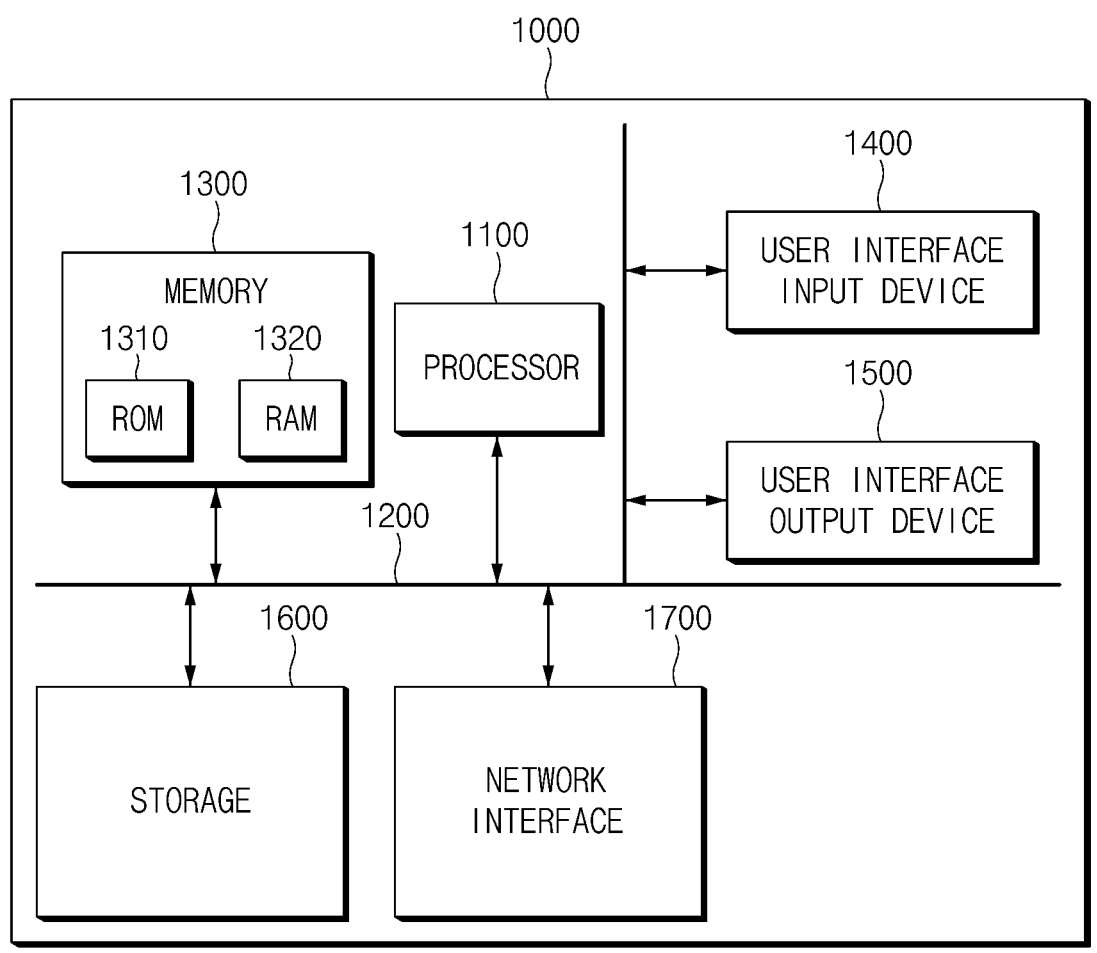
FIG. 8 illustrates a computing system about an autonomous driving control method.

FIG. 8 illustrates a computing system about an autonomous driving control method.

Referring to FIG. 8, a computing system 1000 about the autonomous driving control method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the one or more example embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the autonomous driving control apparatus and the method thereof according to the present disclosure.

While performing autonomous driving control for a host vehicle, if control authority is handed over to the user (e.g., when a hands-off duration is greater than a time limit or when lateral acceleration of the host vehicle meets a specified condition), the autonomous driving control apparatus may provide the user with various notification functions including a guide about a hands-off situation (e.g., a UI for guiding the user to hold the steering wheel) using at least some of previously arranged components (e.g., a display device (or a display) and/or a notification device (or a speaker)).

Furthermore, the autonomous driving control apparatus may provide the user with an additional notification (or warning) to provide safe driving performance, if a driving environment has a relatively high risk to perform autonomous driving control, while obeying regulations about the autonomous driving control.

Furthermore, if a driving state of the host vehicle meets a specific condition (e.g., if lateral acceleration is greater than a specified value during a specified duration), as well as if the host vehicle is traveling on a road having a relatively high curvature, for example, an IC and/or a JC, the autonomous driving control apparatus may provide a notification function, thus improving marketability of an autonomous driving function (e.g., a lane following assist function).

Furthermore, the autonomous driving control apparatus may resume autonomous driving control if an error in sensor data obtained while ramping down an output torque, which is performed together with a notification function, is within a specified range, thus providing the user with a convenient and adaptive autonomous driving control function.

In addition, various effects ascertained directly or indirectly through the present disclosure may be provided.

Hereinabove, although the present disclosure has been described with reference to one or more example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, one or more example embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An autonomous driving control apparatus comprising:

a display device;

a notification device;

a memory storing at least one instruction and a map table comprising a ramp-down time; and a controller operatively connected to the display device, the notification device, and the memory, wherein the at least one instruction is configured to, when executed by the controller, cause the autonomous driving control apparatus to:

determine, while performing autonomous driving control of a host vehicle, a hands-off time duration in which a driver of the host vehicle takes both hands off a steering wheel of the host vehicle;

provide, based on the hands-off time duration being greater than a first threshold time duration or based on lateral acceleration of the host vehicle being maintained at a value greater than a threshold value for at least a second threshold time duration in a hands-off situation, a first notification using at least one of the display device or the notification device, wherein the ramp-down time corresponds to a curvature of a road and the lateral acceleration;

determine, based on a hands-off status and using the map table, the ramp-down time corresponding to the curvature and the lateral acceleration; and ramp down an output torque during the ramp-down time.

2. The autonomous driving control apparatus of claim 1, wherein the at least one instruction is configured to, when executed by the controller, cause the autonomous driving control apparatus to provide the first notification by displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation.

3. The autonomous driving control apparatus of claim 1, wherein the at least one instruction is configured to, when executed by the controller, cause the autonomous driving control apparatus to update the map table using an artificial intelligence model.

4. The autonomous driving control apparatus of claim 1, wherein a ramp-down time during a hands-on status is less than the ramp-down time during the hands-off status.

5. The autonomous driving control apparatus of claim 1, wherein the at least one instruction is configured to, when executed by the controller, further cause the autonomous driving control apparatus to:

provide, based on the hands-off time duration being greater than a third threshold time duration and based on the autonomous driving control of the host vehicle being released, a second notification using at least one of the display device or the notification device, wherein the third threshold time duration is greater than the first threshold time duration.

6. The autonomous driving control apparatus of claim 5, wherein the at least one instruction is configured to, when executed by the controller, cause the autonomous driving control apparatus to provide the second notification by:

displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation; and outputting, using the notification device, a warning sound associated with the hands-off situation or a release of the autonomous driving control.

7. The autonomous driving control apparatus of claim 1, further comprising:

a sensor, wherein the at least one instruction is configured to, when executed by the controller, further cause the autonomous driving control apparatus to:

determine, using the sensor, the curvature of the road on which the host vehicle is traveling; and ramp down, based on at least one of the curvature or the lateral acceleration and based on the autonomous driving control of the host vehicle being released, the output torque for controlling the host vehicle.

8. The autonomous driving control apparatus of claim 7, wherein the at least one instruction is configured to, when executed by the controller, cause the autonomous driving control apparatus to:

ramp down, based on a hands-on status in which the driver of the host vehicle keeps at least one hand on the steering wheel of the host vehicle, the output torque during a predetermined time.

9. The autonomous driving control apparatus of claim 7, wherein the at least one instruction is configured to, when executed by the controller, further cause the autonomous driving control apparatus to:

release, based on first sensor data of the sensor for the autonomous driving control being out of a specified range, the autonomous driving control;

based on at least one of the curvature or the lateral acceleration, ramp down the output torque for controlling the host vehicle; and based on second sensor data of the sensor while ramping down the output torque being within the specified range, resume the autonomous driving control.

10. An autonomous driving control method comprising:

determining, by a controller and while performing autonomous driving control of a host vehicle, a hands-off time duration in which a driver of the host vehicle takes both hands off a steering wheel of the host vehicle;

based on the hands-off time duration being greater than a first threshold time duration or based on lateral acceleration of the host vehicle being maintained at a value greater than a threshold value for at least a second threshold time duration in a hands-off situation, providing, by the controller, a first notification using at least one of a display device or a notification device;

determining, based on a hands-off status and using a map table, a ramp-down time corresponding to a curvature of a road and the lateral acceleration; and ramping down, during the ramp-down time, an output torque for controlling the host vehicle.

11. The autonomous driving control method of claim 10, wherein the providing of the first notification comprises:

providing the first notification by displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation.

12. The autonomous driving control method of claim 10, further comprising:

providing, by the controller and based on the hands-off time duration being greater than a third threshold time duration and based on the autonomous driving control of the host vehicle being released, a second notification using at least one of the display device or the notification device, wherein the third threshold time duration is greater than the first threshold time duration.

13. The autonomous driving control method of claim 12, wherein the providing of the second notification comprises:

displaying, using the display device, information about at least one of an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation; and outputting, using the notification device, a warning sound associated with the hands-off situation or a release of the autonomous driving control.

14. The autonomous driving control method of claim 10, further comprising:

determining, by the controller and using a sensor, the curvature of the road on which the host vehicle is traveling; and ramping down, based on at least one of the curvature or the lateral acceleration and based on the autonomous driving control of the host vehicle being released, the output torque for controlling the host vehicle.

15. The autonomous driving control method of claim 14, wherein the ramping down of the output torque comprises:

ramping down, by the controller and based on a hands-on status in which the driver of the host vehicle keeps at least one hand on the steering wheel of the host vehicle, the output torque during a predetermined time.

16. A non-transitory computer-readable storage medium storing instructions that, when executed, cause:

determining by a controller and while performing autonomous driving control of a host vehicle, a hands-off time duration in which a driver of the host vehicle takes both hands off a steering wheel of the host vehicle; and providing, based on the hands-off time duration being greater than a first threshold time duration or based on lateral acceleration of the host vehicle being maintained at a value greater than a threshold value for at least a second threshold time duration in a hands-off situation, a first notification using at least one of a display device or a notification device;

determining, based on a hands-off status and using a map table stored in a memory, a ramp-down time corresponding to a curvature of a road on which the host vehicle is traveling and the lateral acceleration; and ramping down, during the ramp-down time, an output torque for controlling the host vehicle.

17. The non-transitory computer-readable storage medium of claim 16, wherein the instructions, when executed, cause the providing of the first notification by:

displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation.

18. The non-transitory computer-readable storage medium of claim 16, wherein the instructions, when executed, further cause:

determining, using a sensor, the curvature of the road on which the host vehicle is traveling; and based on at least one of the curvature or the lateral acceleration and based on the autonomous driving control of the host vehicle being released, ramping down the output torque for controlling the host vehicle.

19. The non-transitory computer-readable storage medium of claim 16, wherein the instructions, when executed, further cause:

providing, based on the hands-off time duration being greater than a third threshold time duration and based on the autonomous driving control of the host vehicle being released, a second notification using at least one of the display device or the notification device, wherein the third threshold time duration is greater than the first threshold time duration.

20. The non-transitory computer-readable storage medium of claim 19, wherein the instructions, when executed, cause the providing of the second notification by:

displaying, using the display device, information about at least one of: an ambient temperature of the host vehicle, a driving speed of the host vehicle, a driving mode of the host vehicle, a road on which the host vehicle is traveling, an object proximate to the host vehicle, a remaining distance to a destination, a total driving distance, or a guide about a hands-off situation; and outputting, using the notification device, a warning sound associated with the hands-off situation or a release of the autonomous driving control.

* * * * *